(12) United States Patent
Zhang et al.

(10) Patent No.: US 10,972,544 B2
(45) Date of Patent: Apr. 6, 2021

(54) AUTONOMOUS VEHICLE COMMUNICATION SYSTEM AND METHOD

(71) Applicant: Nissan North America, Inc., Franklin, TN (US)

(72) Inventors: Jingyi Zhang, San Jose, CA (US); Erik Stayton, Cambridge, MA (US); Melissa Cefkin, San Jose, CA (US)

(73) Assignee: Nissan North America, Inc., Franklin, TN (US)

( * ) Notice: Subject to any disclaimer, the term of this patent is extended or adjusted under 35 U.S.C. 154(b) by 253 days.

(21) Appl. No.: 15/425,648

(22) Filed: Feb. 6, 2017

(65) Prior Publication Data

US 2018/0224844 A1    Aug. 9, 2018

(51) Int. Cl.
    G05D 1/00    (2006.01)
    H04L 29/08    (2006.01)
    G05D 1/02    (2020.01)

(52) U.S. Cl.
    CPC .......... H04L 67/125 (2013.01); G05D 1/0011 (2013.01); G05D 1/0061 (2013.01); H04L 67/1097 (2013.01); G05D 2201/0213 (2013.01)

(58) Field of Classification Search
    None
    See application file for complete search history.

(56) References Cited

U.S. PATENT DOCUMENTS

| | | | |
|---|---|---|---|
| 5,448,479 A | 9/1995 | Kemner et al. | |
| 9,494,935 B2 | 11/2016 | Okumura et al. | |
| 9,507,346 B1* | 11/2016 | Levinson | G05D 1/0214 |
| 9,919,648 B1* | 3/2018 | Pedersen | G08G 1/0116 |
| 9,988,055 B1* | 6/2018 | O'Flaherty | H04W 4/90 |
| 2012/0158436 A1* | 6/2012 | Bauer | G06Q 40/02 705/4 |
| 2013/0219294 A1* | 8/2013 | Goldman-Shenhar | G06F 3/0484 715/751 |
| 2016/0104486 A1* | 4/2016 | Penilla | H04L 67/12 704/232 |
| 2017/0105104 A1* | 4/2017 | Ulmansky | H04W 4/70 |

OTHER PUBLICATIONS

"Uber starts self-driving car pickups in Pittsburgh", S. Brewster, Sep. 14, 2016.
"How Far Away Is Driverless Technology Really?", Forbes, Mar. 31, 2015.

* cited by examiner

Primary Examiner — Todd Melton
Assistant Examiner — Jason R Roberson
(74) Attorney, Agent, or Firm — Global IP Counselors, LLP

(57) ABSTRACT

An autonomous vehicle communication method comprises sensing a condition associated with the autonomous vehicle, and initiating, by a controller in response to the sensing of the condition, communication pertaining to the autonomous vehicle between a vehicle manager remote to the autonomous vehicle and an external agent external to the autonomous vehicle. The autonomous vehicle communication method further comprises controlling the autonomous vehicle remotely in response to a command that is based on the condition associated with the autonomous vehicle and the communication between the vehicle manager and the external agent.

20 Claims, 9 Drawing Sheets

AUTONOMOUS VEHICLE COMMUNICATION SYSTEM AND METHOD

BACKGROUND

Field of the Invention

The present invention generally relates to an autonomous vehicle communication system and method. More specifically, the present invention relates to an autonomous vehicle communication system and method for initiating communication pertaining to the autonomous vehicle between a vehicle manager remote to the autonomous vehicle and an external agent external to the autonomous vehicle.

Background Information

An autonomous vehicle can be controlled autonomously, without direct human intervention, to traverse a route of travel. An autonomous vehicle can include a control system that may generate and maintain the route of travel and may control the autonomous vehicle to traverse the route of travel. In a teleoperated system in which autonomous vehicles are operating without drivers, a remote manager can communication with the autonomous vehicles via, for example, a network link. Thus, the remote manager can control movement of an autonomous vehicle in certain situations, such as when the autonomous vehicle is incapable of navigating through obstacles on the road. Also, even when a driver is present in an autonomous vehicle, the remote manager can control movement of the autonomous vehicle to assist the driver in certain situations, such as difficult driving conditions.

SUMMARY

It has been discovered that in some teleoperation situations, it becomes desirable or necessary for the remote manager to communicate with another entity to, for example, obtain additional information for assisting in operating the autonomous vehicle. Therefore, it could be beneficial to automatically initiate such communication between the remote manager and the other entity, which can be referred to generally as an external agent.

In view of the state of the known technology, a disclosed embodiment provides an autonomous vehicle communication method. The autonomous vehicle communication method comprises sensing a condition associated with the autonomous vehicle, and initiating, by a controller in response to the sensing of the condition, communication pertaining to the autonomous vehicle between a vehicle manager remote to the autonomous vehicle and an external agent external to the autonomous vehicle. The autonomous vehicle communication method further comprises controlling the autonomous vehicle remotely in response to a command that is based on the condition associated with the autonomous vehicle and the communication between the vehicle manager and the external agent.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
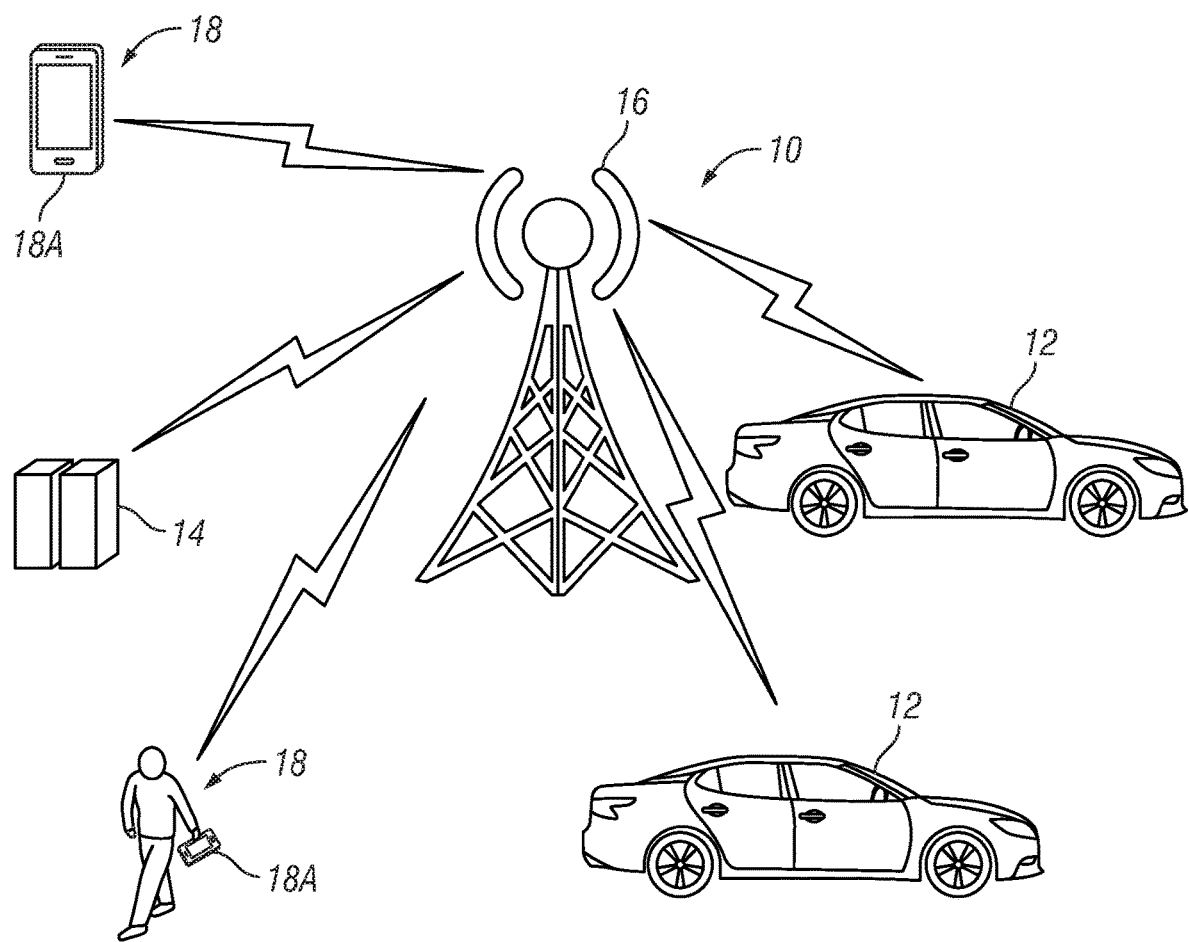
FIG. 1 is a schematic view of an autonomous vehicle communication system according to a disclosed embodiment.

FIG. 1 illustrates an example of an autonomous vehicle communication system 10 according to a disclosed embodiment. The autonomous vehicle communication system 10 includes a plurality of autonomous vehicles 12 and at least one vehicle manager 14 that can communicate with each other via, for example, a communication network 16 using communication links as understood in the art. An autonomous vehicle 12 can be a car, a truck, an SUV, an RV, or any other suitable vehicle as understood in the art. The autonomous vehicle communication system 10 further enables communication between a vehicle manager 14 and at least one external agent 18 which is described in more detail below. Naturally, the autonomous vehicle communication system 10 can also enable communication between an autonomous vehicle 12 and an external agent 18 as discussed below. An external agent 18 can be, for example, an entity that can provide information and services as discussed herein. An external agent 18 can communicate with the vehicle manager 14 via, for example, the communication network 16, direct communication, or in any suitable manner as understood in the art. An external agent 18 can also communication with an autonomous vehicle 12 via, for example, the communication network 16, direct communication, or in any suitable manner as understood in the art.

Figure 2:
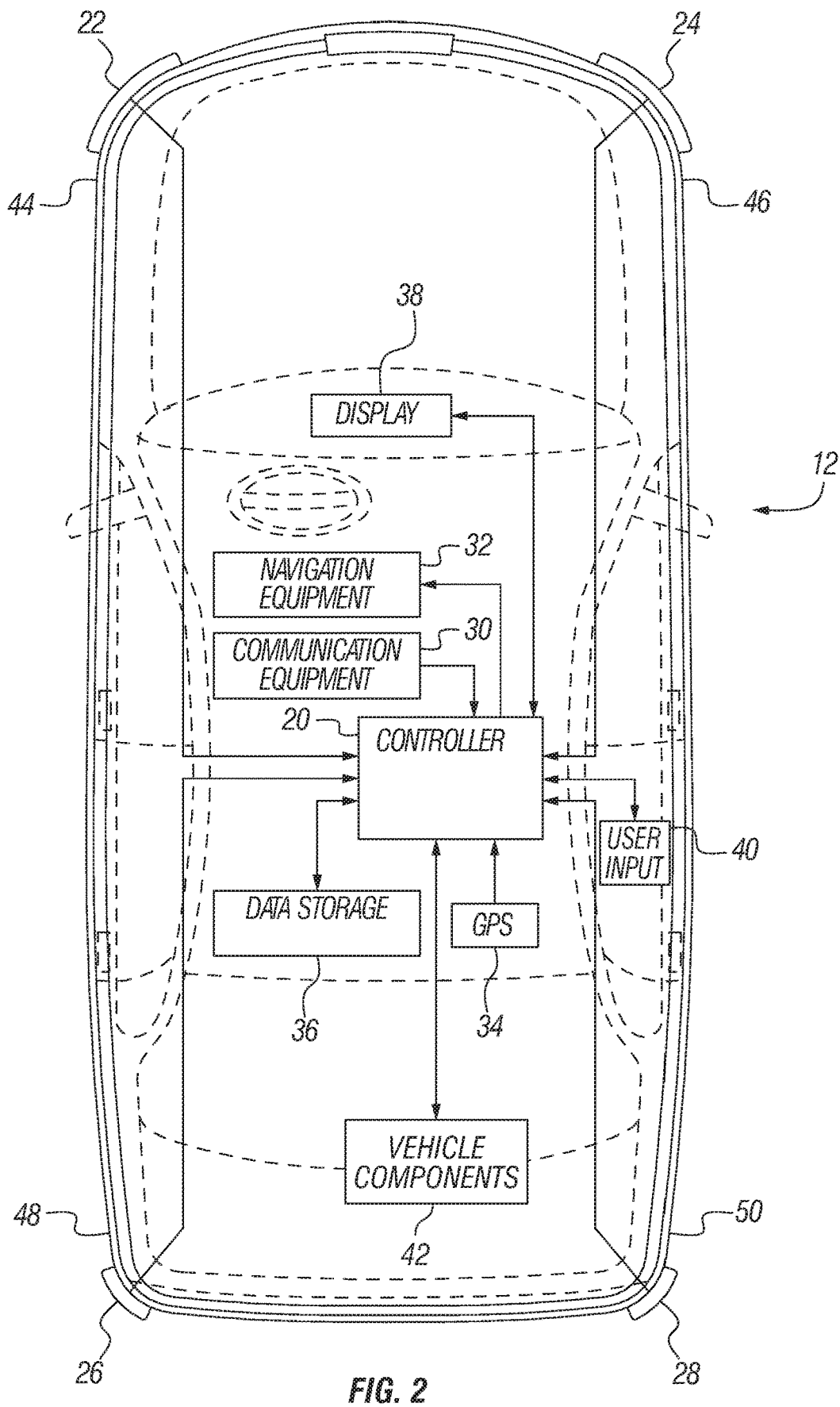
FIG. 2 is a schematic view of an example of an autonomous vehicle in the an autonomous vehicle communication system shown in FIG. 1.

An example of an autonomous vehicle 12 is shown in FIG. 2. As illustrated, the autonomous vehicle 12 includes a controller 20, front vehicle sensors 22 and 24, rear vehicle sensors 26 and 28, communication equipment 30, navigation equipment 32, GPS equipment 34, a data storage 36, a display 38, a user input 40, vehicle components 42 and any other types of equipment typically present in an autonomous vehicle 12 as understood in the art. Although only two front vehicle sensors 22 and 24, two rear vehicle sensors 26 and 28, a display 38 and a user input 40 are shown for exemplary purposes, the autonomous vehicle 12 can include any suitable number of these components.

The data storage 36 can be any suitable type of memory or storage device to which data can be stored and from which data can be retrieved. The display 38 can be any suitable type of display such as an LCD screen, a touch panel, a flat screen display and so on. The user input 40 can be, for example, a touch panel on the display 38, gesture sensing equipment, mechanical or virtual buttons on the steering wheel or at any other suitable locations inside or outside the autonomous vehicle 12 as discussed herein, and so on. The user input 40 can also be a separate device, such as a smart phone, tablet computer, notebook computer or any other suitable type of device that can communicate with the controller 20 via, for example, the communication equipment 30 or in any other suitable manner. The vehicle components 42 can include, for example, electrical and mechanical systems in the autonomous vehicle 12, such as the turn signals, windshield wipers, lights, door latches, trunk latches, tailgate latches, a vehicle entertainment system including audio and visual equipment such as displays, speakers and so on, tactile devices, any system or device necessary or desired for vehicle operation (autonomous or otherwise), such as the brakes and the steering control system, and any other suitable systems as understood in the art. In addition, the vehicle components 42 can include an externally-located audiovisual link having at least one microphone, speaker, camera, RFID reader and video screen, which could also operate as a touch panel. The vehicle components 42 can include at least one PIN pad, fingerprint reader, biometric ID equipment, and facial recognition equipment that can be present at one or more locations inside or outside the autonomous vehicle 12.

The controller 20 includes a processor, such as a microcomputer, with a control program that controls the autonomous vehicle 12 as discussed herein. The processor can be part of a microcomputer. The controller 20 can also include other conventional components such as an input interface circuit, an output interface circuit, and storage devices, such as a ROM (Read Only Memory) device and a RAM (Random Access Memory) device. The internal RAM of the controller 20 can store statuses of operational flags, various control data and so on, and the internal ROM of the controller 20 can store the control program and any information for the various operations described herein as understood in the art. The controller 20 operatively coupled to the front vehicle sensors 22 and 24, rear vehicle sensors 26 and 28, communication equipment 30, navigation equipment 32, GPS equipment 34, a data storage 36, a display 38, a user input 40, vehicle components 42 and the other types of equipment on the autonomous vehicle 12 in any suitable manner as understood in the art, and is programmed to monitor and control these components as discussed herein. The data storage 36 can also store processing results and control programs that are run by the controller 20, such as processing results and control programs for the front vehicle sensors 22 and 24, rear vehicle sensors 26 and 28, communication equipment 30, navigation equipment 32, GPS equipment 34, display 38, user input 40, vehicle components 42 and any other suitable information. The data storage 68 can also store information received from another autonomous vehicle 12, a vehicle manager 14, an external agent 18 and any other entity as discussed herein.

As understood in the art, the vehicle sensors 22, 24, 26 and 28 are configured to monitor and sense the environment surrounding the autonomous vehicle 12, and to detect objects in proximity to the autonomous vehicle 12. As illustrated in FIG. 2, the vehicle sensors 22, 24, 26 and 28 can be mounted externally on front quarter panels 44 and 46, and on rear quarter panels 48 and 50 of the autonomous vehicle 12. However, the vehicle sensors 22, 24, 26 and 28 can be mounted on any suitable external portion of the autonomous vehicle 12, including the front and rear bumpers, the external mirrors or any combination of suitable areas. The vehicle sensors 22, 24, 26 and 28 communicate with the controller 20, which is then capable of using the information provided by the vehicle sensors 22, 24, 26 and 28 to control the autonomous vehicle 12 and to perform the operations discussed herein.

The vehicle sensors 22, 24, 26 and 28 can be any type of sensors desirable. For example, the front vehicle sensors 22 and 24 can include a long-range radar device for object detection in front of the autonomous vehicle 12. The front vehicle sensors 22 and 24 can be configured to detect objects at a predetermined distance (e.g., distances up to 200 m or further as desired), and can have any practical field of view angle (e.g., around 15°) as understood in the art. The front vehicle sensors 22 and 24 can also include short-range radar devices, typically having a larger field of view angle, to assist in monitoring the region in front of the autonomous vehicle 12. The rear vehicle sensors 26 and 28 can also include short-range radar devices and, if desired, long-range radar devices. In addition, the vehicle sensors vehicle sensors 22, 24, 26 and 28 can include cameras, radar sensors, photo sensors or any combination and number of these devices as understood in the art. Although the vehicle sensors 22, 24, 26 and 28 commonly include electronic detection devices that transmit electromagnetic waves (e.g., radar), the vehicle sensors 22, 24, 26 and 28 can include any suitable sensors that, for example, take computer-processed images with a digital camera and analyze the images or emit lasers, as is known in the art.

In addition, the vehicle sensors 22, 24, 26 and 28 can be configured to detect at least the speed, direction, yaw, acceleration and distance of the autonomous vehicle 12. Further, the vehicle sensors 22, 24, 26 and 28 can include other types of object-locating sensing devices including range sensors, such as FM-CW (Frequency Modulated Continuous Wave) radars, pulse and FSK (Frequency Shift Keying) radars, sonar and LIDAR (Light Detection and Ranging) devices, RFID (Radio-Frequency Identification) sensors, and ultrasonic devices which rely upon effects such as Doppler-effect measurements to locate forward objects. Object-locating devices can include charged-coupled devices (CCD) or complementary metal oxide semi-conductor (CMOS) video image sensors, and other known camera/video image processors which utilize digital photographic methods to "view" forward objects including one or more remote vehicles.

The vehicle sensors 22, 24, 26 and 28 can also monitoring oncoming traffic in front of, beside and behind the autonomous vehicle 12. The controller 20 can also use the vehicle sensors 22, 24, 26 and 28 to monitor traffic flow for maintaining lane position or performing lane departure maneuvers for the autonomous vehicle 12. The controller 20 can further determine whether the remote objects detected by the vehicle sensors 22, 24, 26 and 28 are pedestrians or remote vehicles, and the controller 14 can also determine the amount of vehicle traffic and the amount of pedestrian traffic based on the information received from the vehicle sensors 22, 24, 26 and 28.

The communication equipment 30 includes, for example, a receiver and a transmitter configured as individual components or as a transceiver, and any other type of equipment for wireless communication. For example, the communication equipment 30 is configured to communicate wirelessly over one or more communication paths. Examples of communication paths include a cellular telephone network, a wireless network (WiFi or a WiMAX), a DSRC (Dedicated Short-Range Communications) network, a power line communication network, etc. The communication equipment 30 is configured to receive information from external sources and to transmit such information to the controller 20. For example, the communication equipment 30 can communicate with a vehicle manager 14 via, for example, the communication network 16, direct communication, or in any suitable manner as understood in the art. The communication equipment 30 can also communicate with another autonomous vehicle 12, an external agent 18, or any other suitable entity via, for example, the communication network 16, direct communication, or in any suitable manner as understood in the art. Also, the communication equipment 30 can include or interact with, for example, microphones, speakers, displays and any other types of equipment to effect the types of interaction modalities such as audio interaction, audio and visual interaction, menu interface interaction, virtual personal assistant interaction and so on.

Furthermore, the communication equipment 30 can, for example, wirelessly receive information about events scheduled in a given local area from a subscribed local knowledge source via a service provider. For instance, the communication equipment 30 can be configured to receive information from mobile applications, such as social media applications, that are connected to the autonomous vehicle 12 and to transmit such information to the controller 20. For example, the communication equipment 30 can be configured to wirelessly receive information about Facebook and/or Twitter check-ins for various locations in a given area when a mobile phone with the Facebook and/or Twitter applications is connected to the autonomous vehicle 12.

The navigation equipment 32 is configured to receive, for example, information from the controller 20 about a suggested driving route for the autonomous vehicle 12. The suggested driving route can be determined based on information received by the controller 20 from, for example, a mobile application connected to the autonomous vehicle 12, or based on a driving mode of the autonomous vehicle 12 as determined using any methods, devices or systems described herein or known in the art. The navigation equipment 32 can also be in communication with the GPS equipment 34 to determine the suggested driving route. The controller 20 can use information received from the navigation equipment 32 and the GPS equipment 34 to control driving of the autonomous vehicle 12 as understood in the art. The navigation equipment 32 can also be configured to display the suggested driving route to a driver inside the autonomous vehicle 12 on, for example, display 38 or in any other suitable manner. The navigation equipment 32 can also communicate with, for example, a vehicle manager 14, as well as an external agent 18 using the communication equipment 30, directly, or in any other suitable manner.

Figure 3:
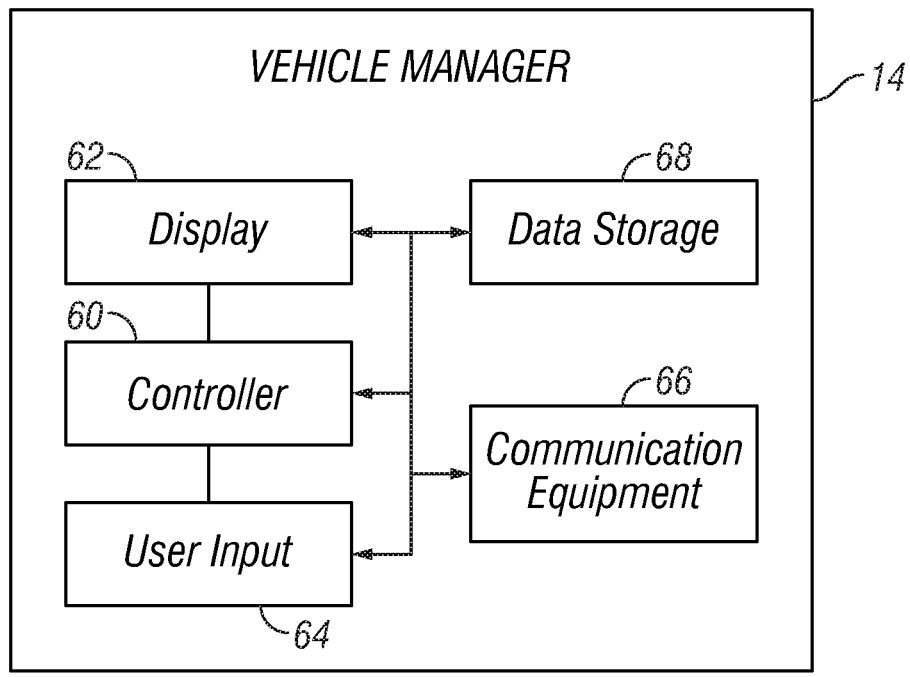
FIG. 3 is a block diagram illustrating an example of components of a vehicle manager in the autonomous vehicle communication system shown in FIG. 1.

As understood in the art, a vehicle manager 14 can be a person or computer entity that is capable of acting as a remote vehicle manager to teleoperatively control an autonomous vehicle 12. A vehicle manager 14 can also be referred to as a vehicle supervisor or other suitable term known in the art. As shown in FIG. 3, the vehicle manager 14 includes or has access to a controller 60, a display 62, a user input 64, communication equipment 66 and a data storage 68. The controller 60 includes a processor, such as a microcomputer, with a control program that controls the components of the vehicle manager 14, and controls the autonomous vehicle 12 when performing teleoperation control of the autonomous vehicle 12, as discussed herein. The processor can be part of a microcomputer. The controller 60 can also include other conventional components such as an input interface circuit, an output interface circuit, and storage devices, such as a ROM (Read Only Memory) device and a RAM (Random Access Memory) device. The internal RAM of the controller 60 can store statuses of operational flags, various control data and so on, and the internal ROM of the controller 60 can store the control program and any information for the various operations described herein as understood in the art.

The controller 60 controls the display 62 to display information pertaining to operation of the vehicle manager 14, information pertaining to the autonomous vehicle 12, information received from an external agent 18, and any other suitable information as understood in the art. The display 62 can be, for example, an LCD display, a touch panel, a flat screen display or any other suitable type of display as known in the art. The user input 64 can be, for example, a touch panel on the display 62, gesture sensing equipment, mechanical or virtual buttons, and so on as understood in the art. The user input 64 can also be a separate device, such as a smart phone, tablet computer, notebook computer or any other suitable type of device that can communicate with the controller 60 via, for example, the communication equipment 66 or in any other suitable manner.

The communication equipment 66 includes, for example, a receiver and a transmitter configured as individual components or as a transceiver, and any other type of equipment for wireless communication. For example, the communication equipment 66 is configured to communicate wirelessly over one or more communication paths with an autonomous vehicle 12, other vehicle managers 14, an external agent 18, other types of content providers or service providers, and any other types of suitable entities as discussed herein. Examples of communication paths include a cellular telephone network, a wireless network (WiFi or a WiMAX), a DSRC (Dedicated Short-Range Communications) network, a power line communication network, etc. The communication equipment 66 is configured to receive information from external sources and to transmit such information to the controller 60. For example, the communication equipment 30 can communicate with an autonomous vehicle 12 via, for example, the communication network 16, direct communication, or in any suitable manner as understood in the art. The communication equipment 66 can also communicate with an external agent 18, another vehicle manager 14 or any other suitable entity via, for example, the communication network 16, direct communication, or in any suitable manner as understood in the art. Also, the communication equipment 66 can include or interact with, for example, microphones, speakers, displays and any other types of equipment to effect the types of interaction modalities such as audio interaction, audio and visual interaction, menu interface interaction, virtual personal assistant interaction and so on.

The data storage 68 can be any suitable type of memory or storage device to which data can be stored and from which data can be retrieved. The data storage 68 can store processing results and control programs that are run by the controller 60, such as processing results and control programs for the display 62, the user input 64 and the communication equipment 66, and any other suitable information. The data storage 68 can also store information received from an autonomous vehicle 12, an external agent 18, another vehicle manager 14 and any other entity as discussed herein.

Figure 4:
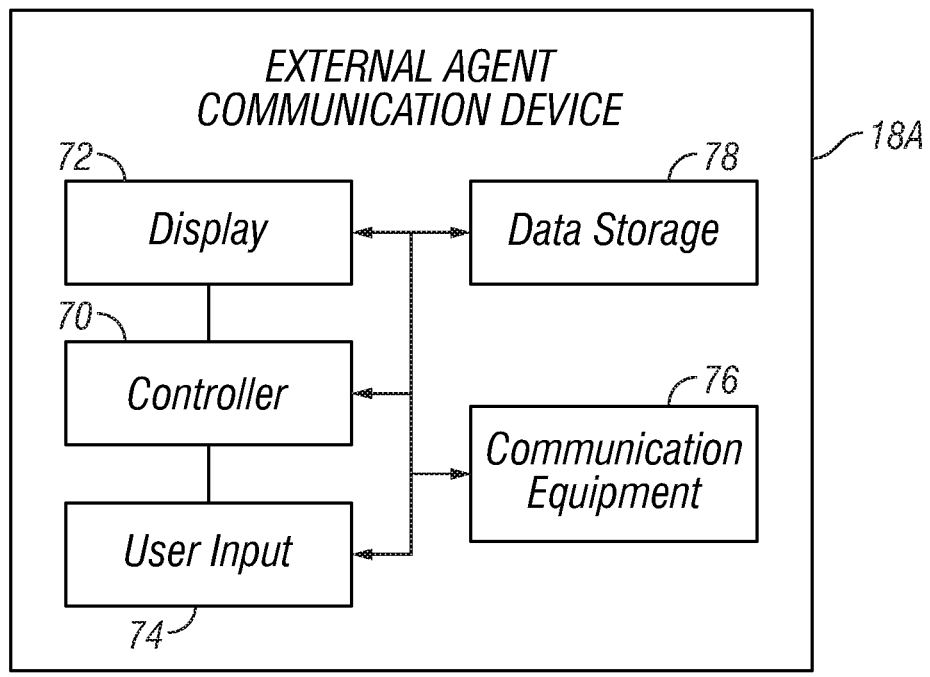
FIG. 4 is a block diagram illustrating an example of components of an external agent communication device that an external agent can use in the autonomous vehicle communication system shown in FIG. 1.

As discussed herein, an external agent 18 can be a person or computer entity that is capable of communicating with a vehicle manager 14 to provide the vehicle manager 14 with information pertaining to, for example, an autonomous vehicle 12, an environment or conditions surrounding or relating to the autonomous vehicle 12, a condition of a driver or passenger of the autonomous vehicle 12, and any other type of information as discussed herein and as would be appreciated by one skilled in the art. The external agent 18 includes or has access to an external agent communication device 18A as shown in FIG. 4, having a controller 70, a display 72, a user input 74, communication equipment 76 and a data storage 78. The controller 70 includes a processor, such as a microcomputer, with a control program that controls the components of the external agent 18 as discussed herein. The processor can be part of a microcomputer. The controller 70 can also include other conventional components such as an input interface circuit, an output interface circuit, and storage devices, such as a ROM (Read Only Memory) device and a RAM (Random Access Memory) device. The internal RAM of the controller 70 can store statuses of operational flags, various control data and so on, and the internal ROM of the controller 70 can store the control program and any information for the various operations described herein as understood in the art.

The controller 70 controls the display 72 to display information such as information that the external agent 18 can provide to the vehicle manager 14, along with any other information as understood in the art. The display 72 can be, for example, an LCD display, a touch panel, a flat screen display or any other suitable type of display as known in the art. The user input 74 can be, for example, a touch panel on the display 72, gesture sensing equipment, mechanical or virtual buttons, and so on as understood in the art. The user input 74 can also be a separate device, such as a smart phone, tablet computer, notebook computer or any other suitable type of device that can communicate with the controller 70 via, for example, the communication equipment 76 or in any other suitable manner.

The communication equipment 76 includes, for example, a receiver and a transmitter configured as individual components or as a transceiver, and any other type of equipment for wireless communication. For example, the communication equipment 76 is configured to communicate wirelessly over one or more communication paths with a vehicle manager 14, an autonomous vehicle 12, other external agents 18, and other entities such as content providers, service providers and so on as discussed herein. Examples of communication paths include a cellular telephone network, a wireless network (WiFi or a WiMAX), a DSRC (Dedicated Short-Range Communications) network, a power line communication network, etc. The communication equipment 76 is configured to receive information from external sources and to transmit such information to the controller 70. For example, the communication equipment 30 can communicate with a vehicle manager 14 via, for example, the communication network 16, direct communication, or in any suitable manner as understood in the art. The communication equipment 76 can also communicate with an autonomous vehicle 12, another external agent 18 or any other suitable entity via, for example, the communication network 16, direct communication, or in any suitable manner as understood in the art. Also, the communication equipment 76 can include or interact with, for example, microphones, speakers, displays and any other types of equipment to effect the types of interaction modalities such as audio interaction, audio and visual interaction, menu interface interaction, virtual personal assistant interaction and so on.

The data storage 78 can be any suitable type of memory or storage device to which data can be stored and from which data can be retrieved. The data storage 78 can store processing results and control programs that are run by the controller 70, such as processing results and control programs for the display 72, the user input 74 and the communication equipment 76, and any other suitable information. The data storage 78 can also store information received from an autonomous vehicle 12, a vehicle manager 14, another external agent 16 and any other entity as discussed herein.

Examples of operations performed by the autonomous vehicle communication system 10 to initiate communication pertaining to an autonomous vehicle 12 between a vehicle manager 14 and an external agent 18 will now be described. As discussed above, in some teleoperation situations, it becomes desirable or necessary for the remote vehicle manager 14 to communicate with another entity to, for example, obtain additional information for assisting in operating the autonomous vehicle 12. Therefore, it could be beneficial to automatically initiate such communication between the remote manger 14 and an external agent 18.

Figure 5:
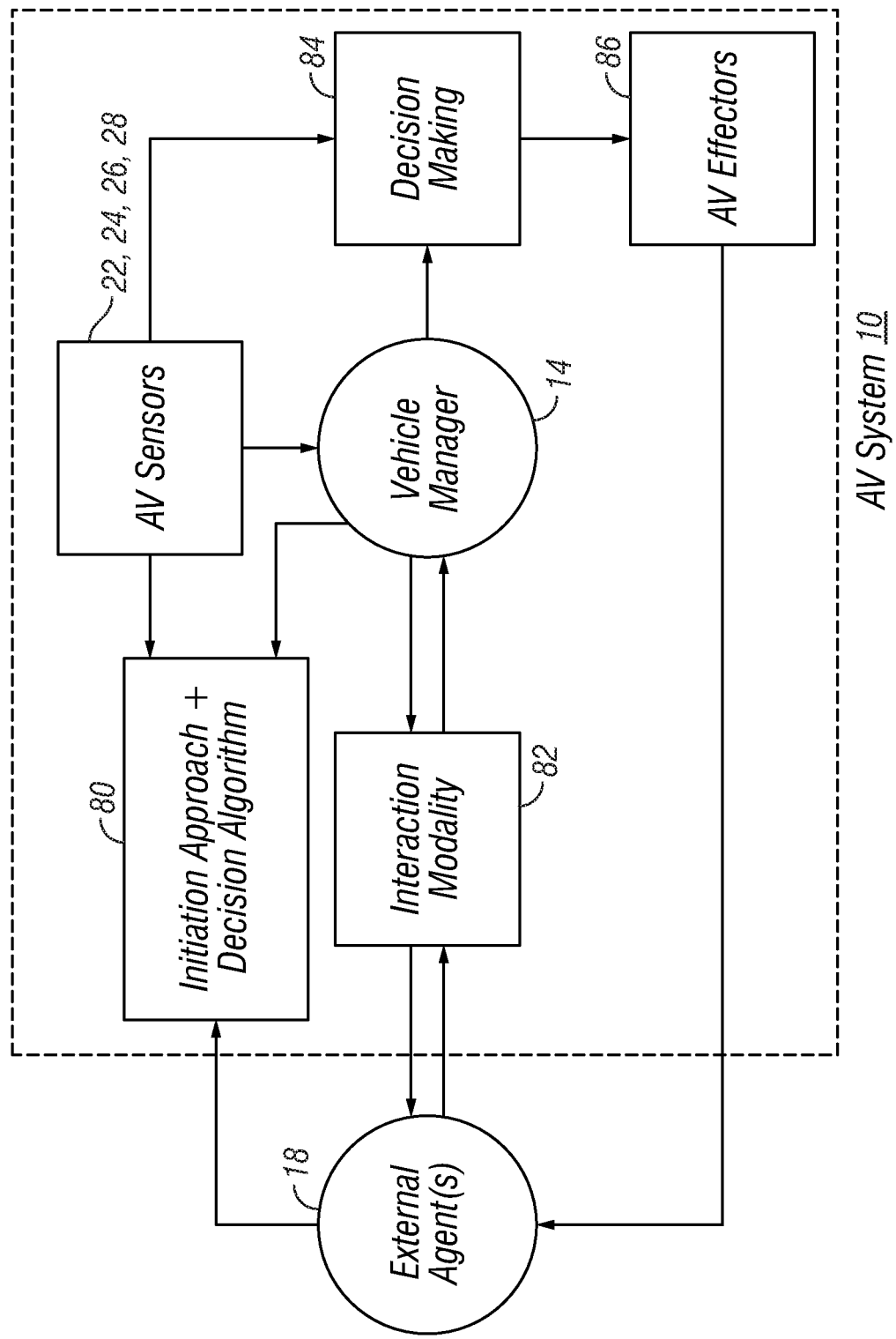
FIG. 5 is a conceptual block diagram illustrating an example of communication between a vehicle manager and an external agent in the autonomous vehicle communication system shown in FIG. 1.

FIG. 5 is a conceptual block diagram illustrating an example in which communication is initiated between the vehicle manager 14 of the autonomous vehicle communication system 10 and an external agent 18 as shown in FIG. 1. As discussed in detail below, such communication can be initiated by one or more initiation approaches and decision algorithms 80 that can be performed by, for example, the controller 20 at the autonomous vehicle 12 individually or in cooperation with the controller 60 at the vehicle manager 14 discussed above. As shown, the initiation approach portion of the initiation approach and decision algorithm 80 can receive information from a combination of a vehicle manager 14, external agents, and sensors such as sensors 22, 24, 26 and 28 at the autonomous vehicle 12 as discussed above. The decision algorithm portion of the initiation approach and decision algorithm 80 determines whether the appropriate information has been received by the initiation approach and, if such information has been received, the decision algorithm can establish communication between the vehicle manager 14 and an external agent 18 using any suitable type of interaction modality 82 described herein. The controller 60 at the vehicle manager 14, individually or in combination with the controller 20 at the autonomous vehicle 12, can also perform decision making operations 84, such as those described below with regard to the flow diagrams in FIGS. 7 through 10, that provide to the external agent 18 autonomous vehicle effectors 86, such as the assistance needed with regard to the autonomous vehicle 12, and so on, as discussed below with regard to the flow diagrams in FIGS. 7 through 10.

The interaction modalities 82 include, for example, audio communication, which can be effected by microphones and speakers of the communication equipment 66 at the vehicle manager 14 and microphones and speakers of the communication equipment 76 of the external agent communication device 18A at the external agent 18. The interaction modalities 82 also include audio and visual communication which can be effected by the display 62, along with cameras, microphones and speakers of the communication equipment 66, at the vehicle manager 14, and the display 72, along with cameras, microphones and speakers of the communication equipment 76, of the external agent communication device 18A at the external agent 18. The interaction modalities 82 further include interface communication, such as a display of a menus of options, icons and so on, by the display 62 at the vehicle manager and by the display 72 of the external agent communication device 18A at the external agent 18. In addition, the interaction modalities 82 can include a virtual personal assistant or avatar that can be effected by, for example, the display 62, along with cameras, microphones and speakers of the communication equipment 66, at the vehicle manager 14, and the display 72, along with cameras, microphones and speakers of the communication equipment 76, of the external agent communication device 18A at the external agent 18.

Figure 6:
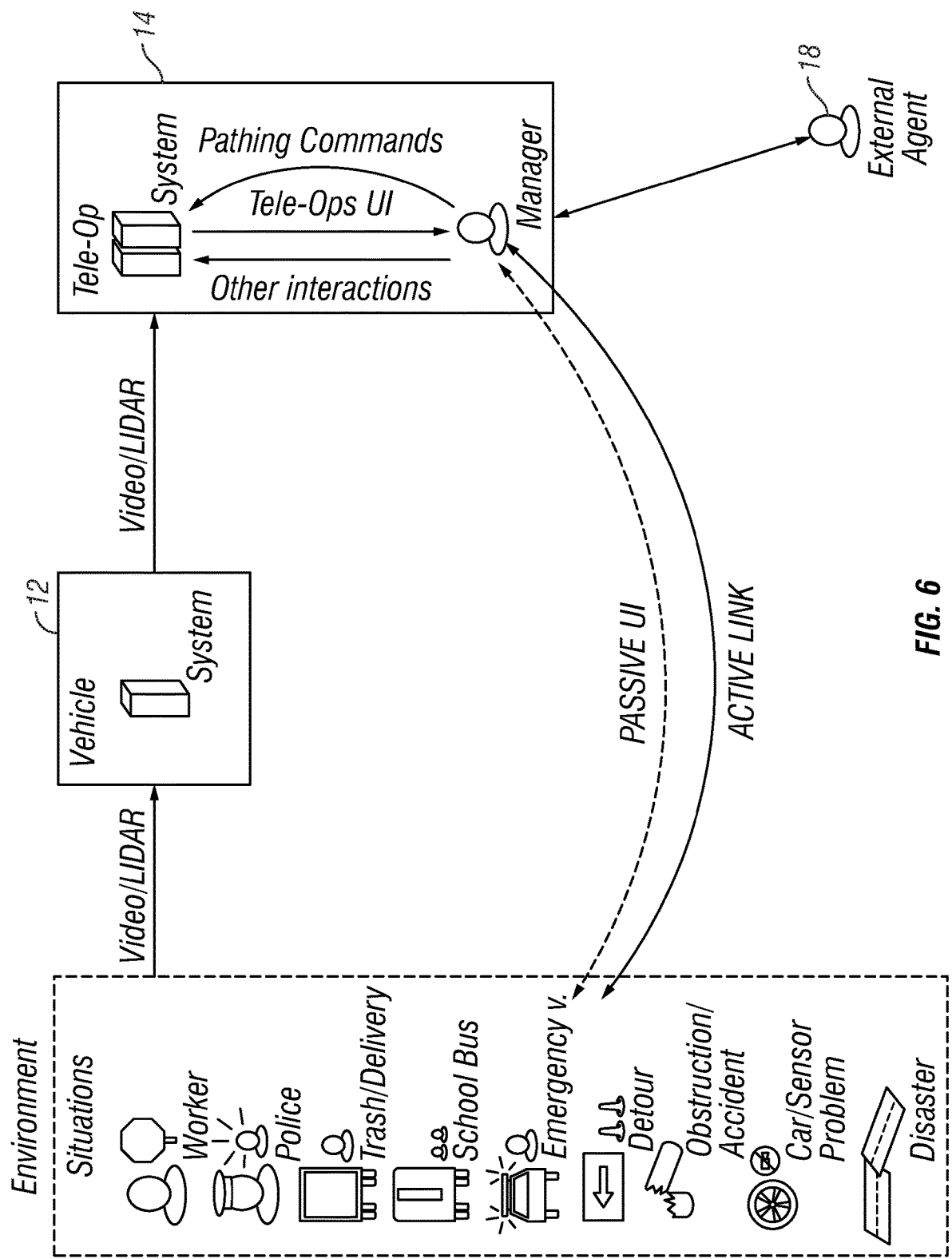
FIG. 6 is a conceptual block diagram illustrating an example of environmental situations that are sensed by an autonomous vehicle and communicated to a vehicle manager, which further communicates with an external agent, in the autonomous vehicle communication system shown in FIG. 1.

FIG. 6 is a conceptual block diagram illustrating an example of environmental situations that are sensed by an autonomous vehicle 12 and communicated to a vehicle manager 14, which can result in an initiation in communication between the vehicle manager 14 and the external agent 18. Also, although the discussions herein refer to communication between the vehicle manager 14 and the external agent 18, it should be understood that such communication between the vehicle manager 14 and the external agent 18 can refer to communication between the vehicle manager 14 and the external agent communication device 18A being used by the external agent 18. As understood in the autonomous vehicle art, if there is not a person inside the autonomous vehicle 12 who is capable, at all times, of taking over control of the autonomous vehicle 12, a remote manager 14 may need to exert control over the autonomous vehicle 12 by teleoperation as understood in the art. For example, certain types of autonomous vehicles 12 are capable of fully autonomous driving in which no person is present in the autonomous vehicle 12. However, even autonomous vehicles 12 in which a human driver is present may experience situations in which it may be appropriate for a remote manager 14 to exert control over the autonomous vehicle 12 by teleoperation.

For example, the driver may become distracted or otherwise incapacitated and thus not 100% focused on driving the autonomous vehicle 12. In the autonomous vehicle communication system 10, the vehicle manager 14 can monitor the condition of the autonomous vehicle 12 by receiving information from, for example, the sensors 22, 24, 26 and 28 at the autonomous vehicle 12 that is communicated to the vehicle manager 14 by, for example, the communication equipment 30 at the autonomous vehicle 12 and received by the communication equipment 66 at the vehicle manager 14. As discussed above, the controller 60 at the vehicle manager 14 can analyze this information received from the sensors 22, 24, 26 and 28 and provide this information to, for example, a person at the vehicle manager 14 via the display 62 at the vehicle manager 14. If the person at the vehicle manager 14 determines based on this information that it may be appropriate to control the autonomous vehicle 12, the vehicle manager 14 can perform such control by, for example, designating a travel path for the autonomous vehicle 12 to follow.

However, it is possible that the person at the vehicle manager 14 may desire or need additional information to properly control the autonomous vehicle 12 teleoperatively. For example, if the information provided by the sensors 22, 24, 26 and 28 is insufficient to enable the person at the vehicle manager 14 to designate a new travel path, the person at the vehicle manager 14 may find it beneficial to communicate with an external agent 18 that may have more information about the environment in which the autonomous vehicle 12 is traveling.

For instance, as shown in FIG. 6, the sensors 22, 24, 26 and 28 may determine that the autonomous vehicle is travelling in an area in which construction workers or police are present (e.g., the sensors 22, 24, 26 and 28 sense the presence of people in reflective vests blocking the road). Therefore, certain routes may be obstructed or impeded. Likewise, the sensors 22, 24, 26 and 28 may determine that the autonomous vehicle 12 is travelling in an area in which trash delivery or pick-up is occurring, and thus certain routes may be congested. Also, the sensors 22, 24, 26 and 28 may determine that the autonomous vehicle 12 is travelling near a school bus and thus may need to stop more frequently. The sensors 22, 24, 26 and 28 may determine that an emergency vehicle is approaching the autonomous vehicle 12 and thus, it may become necessary for the autonomous vehicle 12 to pull to the side of the road or otherwise create a passage for the emergency vehicle. The sensors 22, 24, 26 and 28 may determine that a detour is present along the route in which the autonomous vehicle 12 is travelling and thus, the travel path of the autonomous vehicle 12 will need to be rerouted. Similarly, the sensors 22, 24, 26 and 28 may determine that an obstruction or accident exists in the path along which the autonomous vehicle 12 is travelling and thus, a different travel path for the autonomous vehicle 12 will be needed. Furthermore, the sensors 22, 24, 26 and 28 may determine that the autonomous vehicle 12 is experiencing mechanical or other problems and will need assistance. In addition, the sensors 22, 24, 26 and 28 may determine that a natural or man-made disaster has occurred in an area around which the autonomous vehicle 12 is travelling and thus, the travel path of the autonomous vehicle 12 will need to be rerouted to avoid the disaster area.

For some of the situations mentioned above, the person at the vehicle manager 14 may find it desirable to acquire more information, ask for additional assistance, or provide vehicular information. Therefore, the person at the vehicle manager 14 can initiate communication with an external agent 18 from the vehicle manager 14 as discussed herein. Also, for some of the situations mentioned above, the controller 20 at the autonomous vehicle 12 can communicate with the vehicle manager 14 to cause the vehicle manager 14 to initiate communication between the vehicle manager 14 and the external agent 18. For example, if the sensors 22, 24, 26 and 28 determine based on a driving pattern that the driver of the autonomous vehicle 12 may be ill, the controller 20 can communicate with the vehicle manager 14 to cause the vehicle manager 14 to initiate communication with an external agent 18, such as a police officer or an emergency responder, since the driver may be incapable of initiating such a communication. Typically, communication can be initiated at the autonomous vehicle 12 based on information obtained by the sensors 22, 24, 26 and 28 which, as discussed above, can include cameras, LIDAR devices, RFID sensors and so on. Communication can also typically be initiated at the autonomous vehicle 12 to perform communication, such as DSRC, or a specific request such as a request to obtain information about a particular area such as a construction zone. Furthermore, if the autonomous vehicle 12 is acting as a delivery vehicle, communication may be initiated at the autonomous vehicle 12 when the autonomous vehicle 12 enters a package unloading area, so that the vehicle manger 14 can, for example, assist with the delivery.

In addition, for some of the situations mentioned above, an external agent 18 may desire to interact with the vehicle manager 14 and thus, the external agent 18 can initiate the communication between the external agent 18 and the vehicle manager 14. As shown in FIG. 6, passive and active communication links can exist between the vehicle manager 14 and certain entities in the environment, such as police, emergency responders and so on, who can function as external agents 18. Whether the communication links are active or passive depend on, for example, whether an external agent 18 is communicating with the vehicle manager 14. For example, even though the vehicle manager 14 may be designating a new path for the autonomous vehicle 12, an external agent 18, such as a police officer, may request the vehicle manager 14 designate a different path. The police officer may also request that the vehicle manager 14 archive data pertaining to the autonomous vehicle 12 for investigative purposes, especially if the autonomous vehicle 12 was involved in an accidence, a driving while intoxicated incident, and so on. Alternatively, an external agent 18 may desire to communicate with the vehicle manager 14 to discuss or diagnose mechanical problems with the autonomous vehicle 12. A delivery person may act as an external agent 18 to request that the vehicle manager 14 control the autonomous vehicle 12 to open a compartment, such as the rear hatch or trunk, so that the delivery person can place a package in the rear hatch or trunk. In addition, the vehicle manager 14 may communicate with external agents 18, such as a construction supervisor, police officer and so on, to try to develop a more efficient travel path for the autonomous vehicle 12.

It should be further noted that in certain situations, an external agent 18 can initiate communication between the external agent 18 and the vehicle manager 14 at the autonomous vehicle 12. For example, as discussed above with regard to FIG. 2, the vehicle components 42 of an autonomous vehicle 12 can include an externally-located audiovisual link having at least one microphone, speaker, camera, RFID reader and display screen, which could also operate as a touch panel. When an external agent 18 presents the correct encrypted RFID tag to the RFID reader, the controller 20 can send a request to the vehicle manager 14 via, for example, the communication equipment 30. Upon receiving the request, the controller 60 at the vehicle manager 14 can automatically connect the vehicle manager 14 to that external agent 18 using any of the modalities discussed above, such as an audiovisual link. The vehicle manager 14 and external agent 18 can thus communication with each other using the audiovisual link.

An external agent 18 can also initiate communication between the external agent 18 and the vehicle manager 14 at the autonomous vehicle 12 by entering the correct PIN on the PIN pad, or using a fingerprint reader, which are included among the vehicle components 42 as discussed above. The external agent 18 can further initiate communication between the external agent 18 and the vehicle manager 14 at the autonomous vehicle 12 using, for example, a dongle, Bluetooth communication, NFC (near field communication), WIFI communication, a smartphone app, or by a QR code that can be recognized by a camera among the vehicle components 42. Also, the facial recognition equipment of the vehicle components 42 as discussed above can be used to recognize the external agent 18 to initiate communication between the external agent 18 and the vehicle manager 14. In addition, the cameras included in the vehicle components 42 can determine that an external agent 18 is approaching the autonomous vehicle 12 by detecting a gesture by the external agent 18, or a gaze by the external agent 18 that is fixed on the autonomous vehicle 12. Thus, the external agent 18 can use this gesture or gaze detection technology to initiate communication between the external agent 18 and the vehicle manager 14.

The communication initiated by the external agent 18 in any of the manners described above can be effected by any of the modalities described herein. For example, the vehicle manager 14 can communicate with the external agent 18 using an audio link, or receive basic pre-defined instructions from the touchable display. When some combination of fingerprint and PIN, or secure RFID and PIN, or facial recognition and PIN are used, a virtual assistant can be operated by, for example, the controller 20 to provides voice and menu-based options on the external display screen on the autonomous vehicle 12 for access by the external agent 18. If the external option to speak to the vehicle manger 14 is selected, the controller 20 initiates a call to the vehicle manager 14 and automatically connects vehicle manger 14 to, for example, the external agent communication device 18A of that external agent 18. However, if the controller 20, for example, determines that the external agent 18 is unsuccessfully interacting with the avatar, or unsuccessfully attempts authentication more than a permitted number of times, the controller 20 can initiate a call to a vehicle manager 14 and automatically connect the vehicle manager 14 to the external agent communication device 18A of that external agent 18. In either case, the vehicle manger 14 can communicate by controlling the speech of the virtual agent, and can receive audio and video from the modality.

The flow diagrams shown in FIGS. 7 through 10 illustrate an example of operations performed by the autonomous vehicle communication system 10 to initiate communication between a vehicle manager 14 and an external agent 18 in certain situations. The type of communication initiation in these situations can be generally referred to as self-initiation. In FIGS. 7 through 10, operations or conditions pertaining to a human are designated by circles or ovals, while operations or conditions performed by the autonomous vehicle communication system 10 are designated by squares or rectangles.

Figure 7:
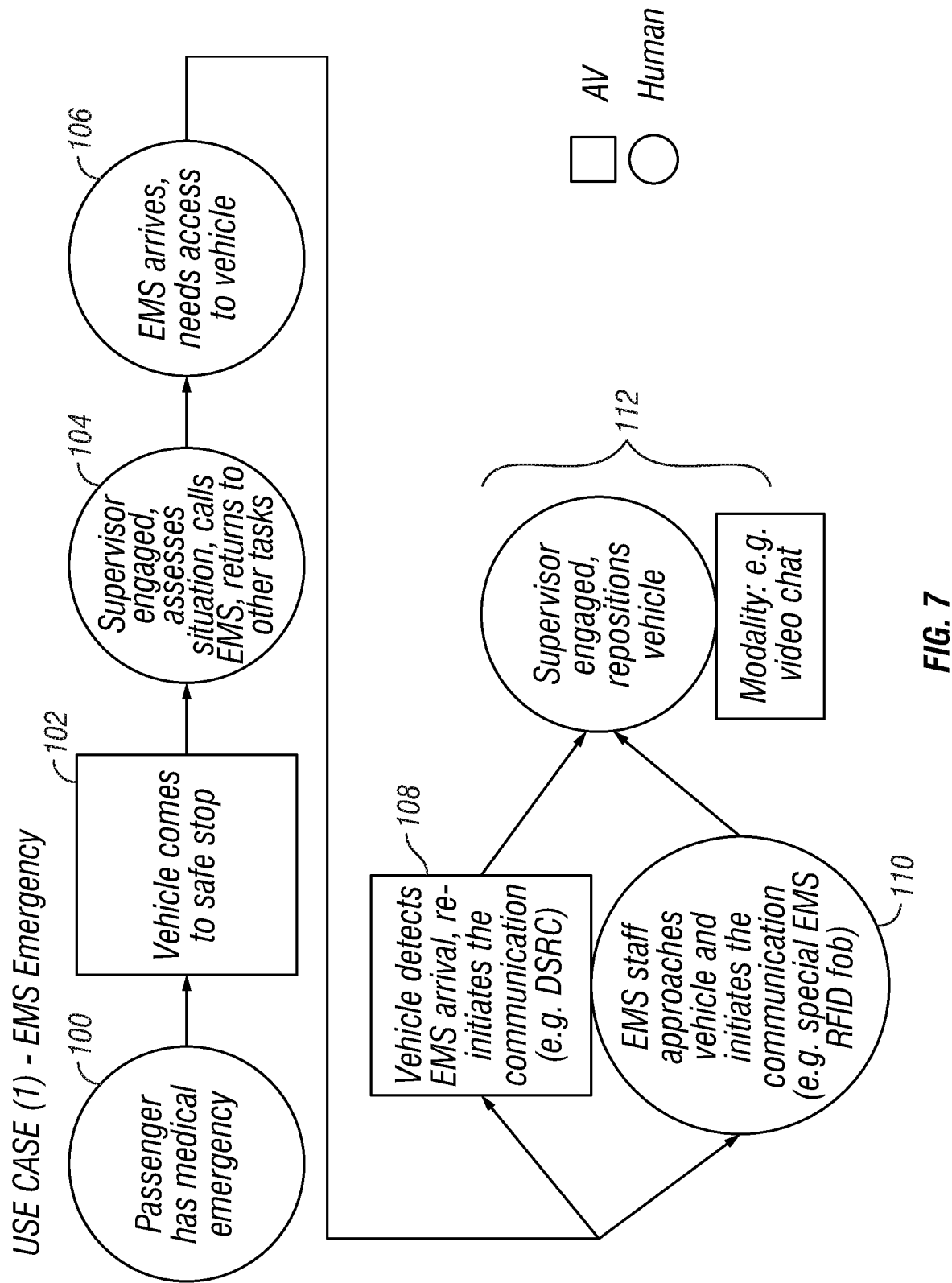
FIG. 7 is a flow diagram illustrating an example of operations performed by the autonomous vehicle communication system shown in FIG. 1 to initiate communication between a vehicle manager and an external agent in an emergency situation relating to an autonomous vehicle.

FIG. 7 is a flow diagram illustrating an example of operations performed by the autonomous vehicle communication system 10 to initiate communication between a vehicle manager 14 and an external agent 18 in an emergency situation relating to an autonomous vehicle. In Step 100, the driver or a passenger in the autonomous vehicle 12 has medical emergency. The controller 20, for example, can determine this condition of the driver or passenger based on information provided by the sensors 22, 24, 26 and 28 and the vehicle components 42 as understood in the art. Thus, in Step 102, the controller 20 can control the autonomous vehicle 12 to come to a safe stop. While the controller 20 is stopping the autonomous vehicle 12, the controller 20 can automatically inform the vehicle manger 14 of the emergency situation in Step 104. Also during Step 104, the vehicle manger 14 can call EMS (emergency medical services) and then continue with performing other tasks.

In Step 106, EMS personnel arrive at the autonomous vehicle 12 and need access to the autonomous vehicle 12. Any EMS personnel can therefore act as an external agent 18 and initiate communication with the vehicle manger 14. For example, in Step 108, the autonomous vehicle 12 can detect EMS arrival using any of the sensors and technologies described above, such as DSRC, and the controller 20 can send a request to the vehicle manager 14 to initiate communication between the vehicle manger 14 and the external agent 18 as described above. Alternatively, in Step 110, the EMS staff acting as the external agent 18 can approach the autonomous vehicle 12 with, for example, an EMS RFID fob or any other suitable type of device that the sensors 22, 24, 26 and 28 and/or the vehicle components 42 can detect as discussed above. Upon detecting the EMS RFID fob, the controller 20 can send a request to the vehicle manager 14 to initiate communication between the vehicle manger 14 and the external agent 18 as described above. Naturally, the EMS staff could also initiate communication with the vehicle manager 14 using a communication device 18A such as that described above with regard to FIG. 4. In Step 112, the vehicle manger 14 and the external agent 18 communicate with each other using, for example, video chat or any of the modalities described above. Thus, the vehicle manager 14 can teleoperatively control the autonomous vehicle 12 to, for example, unlocks its doors, move to another location along the road, and so on.

Figure 8:
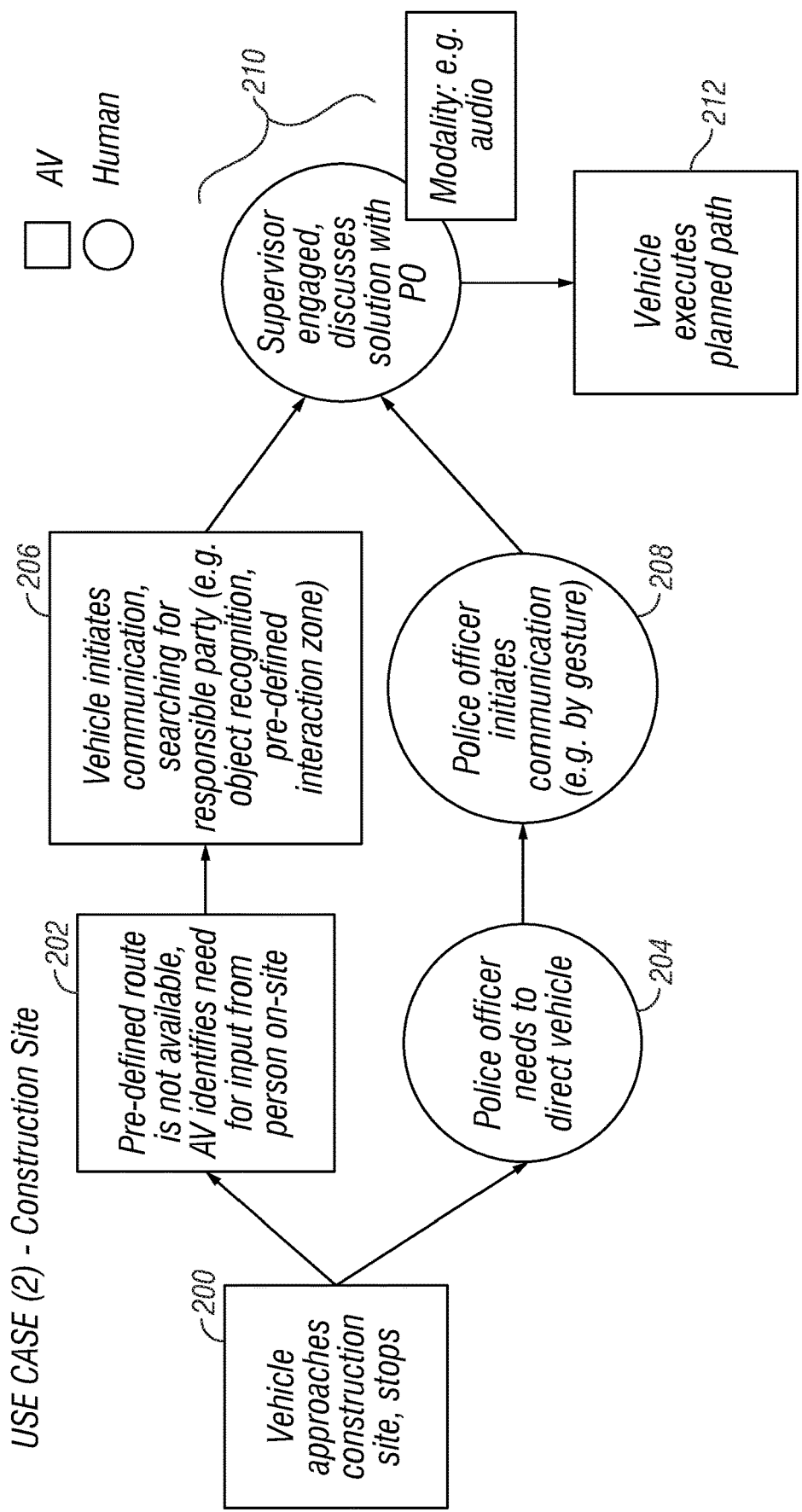
FIG. 8 is a flow diagram illustrating an example of operations performed by the autonomous vehicle communication system shown in FIG. 1 to initiate communication between a vehicle manager and an external agent in a situation in which an autonomous vehicle is travelling in a construction area.

FIG. 8 is a flow diagram illustrating an example of operations performed by the autonomous vehicle communication system 10 to initiate communication between a vehicle manager 14 and an external agent 18 in a situation in which an autonomous vehicle is travelling in, for example, a construction area or any other obstructed area. In Step 200, the autonomous vehicle 12 approaches the construction site, and the controller 20 stops the autonomous vehicle 12 upon, for example, the sensors 22, 24, 26 and 28 sensing the presence of the construction site. In Step 202, the controller 20 of the autonomous vehicle 12 identifies a need for information from a person at the construction site. Also, in Step 204, a police officer determines that the autonomous vehicle 12 needs to be directed.

Accordingly, in Step 206, the controller 20 can send a request to the vehicle manager 14 to initiate communication between the vehicle manger 14 and an external agent 18 as described above. The external agent 18 can be a person in the construction zone that can assist the vehicle manager 14 in maneuvering the autonomous vehicle 12 through the construction zone. In addition, in Step 208, the police officer can perform operations at the autonomous vehicle 14 as discussed above to initiate communication with the vehicle manager 14. For example, the police officer can make a gesture that is recognized by the gesture recognition equipment among the vehicle components 42 as discussed above to cause the controller 20 to send a request to the vehicle manager 14 to initiate communication with the police officer who, in this case, would be an external agent 18. Naturally, the police officer could also initiate communication with the vehicle manager 14 using a communication device 18A such as that described above with regard to FIG. 4.

Accordingly, in Step 210, the vehicle manger 14 and the external agent 18 (police officer) communicate with each other using, for example, audio communication or any of the modalities described above. Thus, the vehicle manager 14 can teleoperatively control the autonomous vehicle 12 to, for example, move along a path suggested by the police officer in Step 212.

Figure 9:
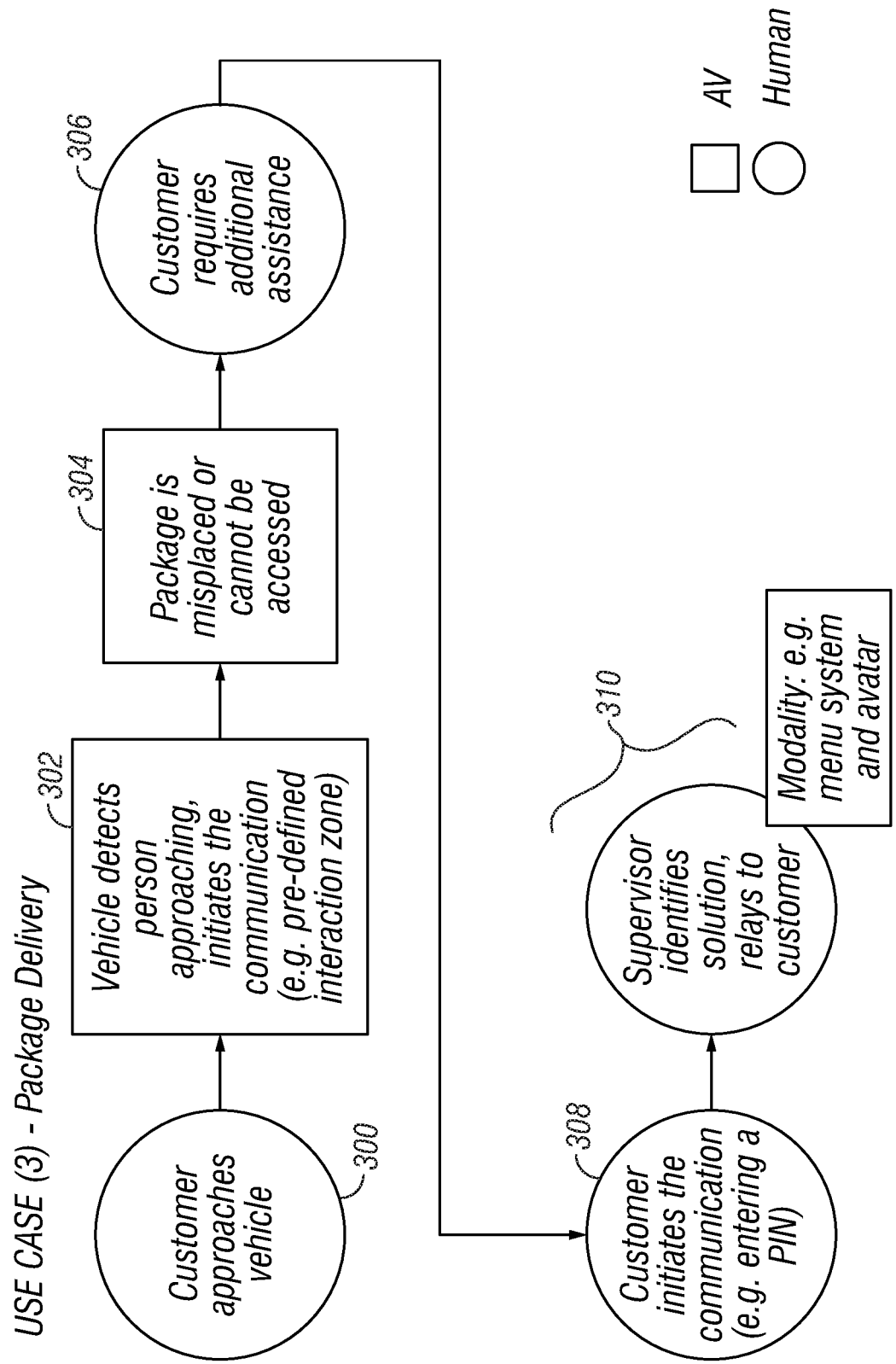
FIG. 9 is a flow diagram illustrating an example of operations performed by the autonomous vehicle communication system shown in FIG. 1 to initiate communication between a vehicle manager and an external agent in a situation in which a package is being delivered to an autonomous vehicle.

FIG. 9 is a flow diagram illustrating an example of operations performed by the autonomous vehicle communication system 10 to initiate communication between a vehicle manager 14 and an external agent 18 in a situation in which a package is being delivered to an autonomous vehicle 12. In Step 300, a customer approaches the autonomous vehicle 12. In Step 302, the cameras included in the vehicle components 42 can determine that a person is approaching the autonomous vehicle 12 as described above. In Step 304, it is determined that the package supposed to be in the autonomous vehicle 12 is misplaced or cannot be accessed by the customer. Thus, in Step 306, the customer determines that additional assistance is required, and in Step 308 initiates communication with the vehicle manager 14. For example, the customer can enter a PIN on an external touch pad of the vehicle components 42 on the autonomous vehicle 12 as described above. Upon detecting the PIN, the controller 20 can send a request to the vehicle manager 14 to initiate communication between the vehicle manger 14 and the customer, who is now acting as an external agent. Naturally, the customer could use any of the other technologies of the autonomous vehicle 12 described above, such as a QR code, etc., or a communication device 18A such as that described above with regard to FIG. 4, to initiate communication with the vehicle manager 14. Accordingly, in Step 310, the vehicle manger 14 and the external agent 18 (customer) communicate with each other using, for example, a menu system and avatar, or any of the modalities described above. Thus, the vehicle manager 14 can teleoperatively control the autonomous vehicle 12 to, for example, open a compartment of the autonomous vehicle 12 to give the customer access to the package.

Figure 10:
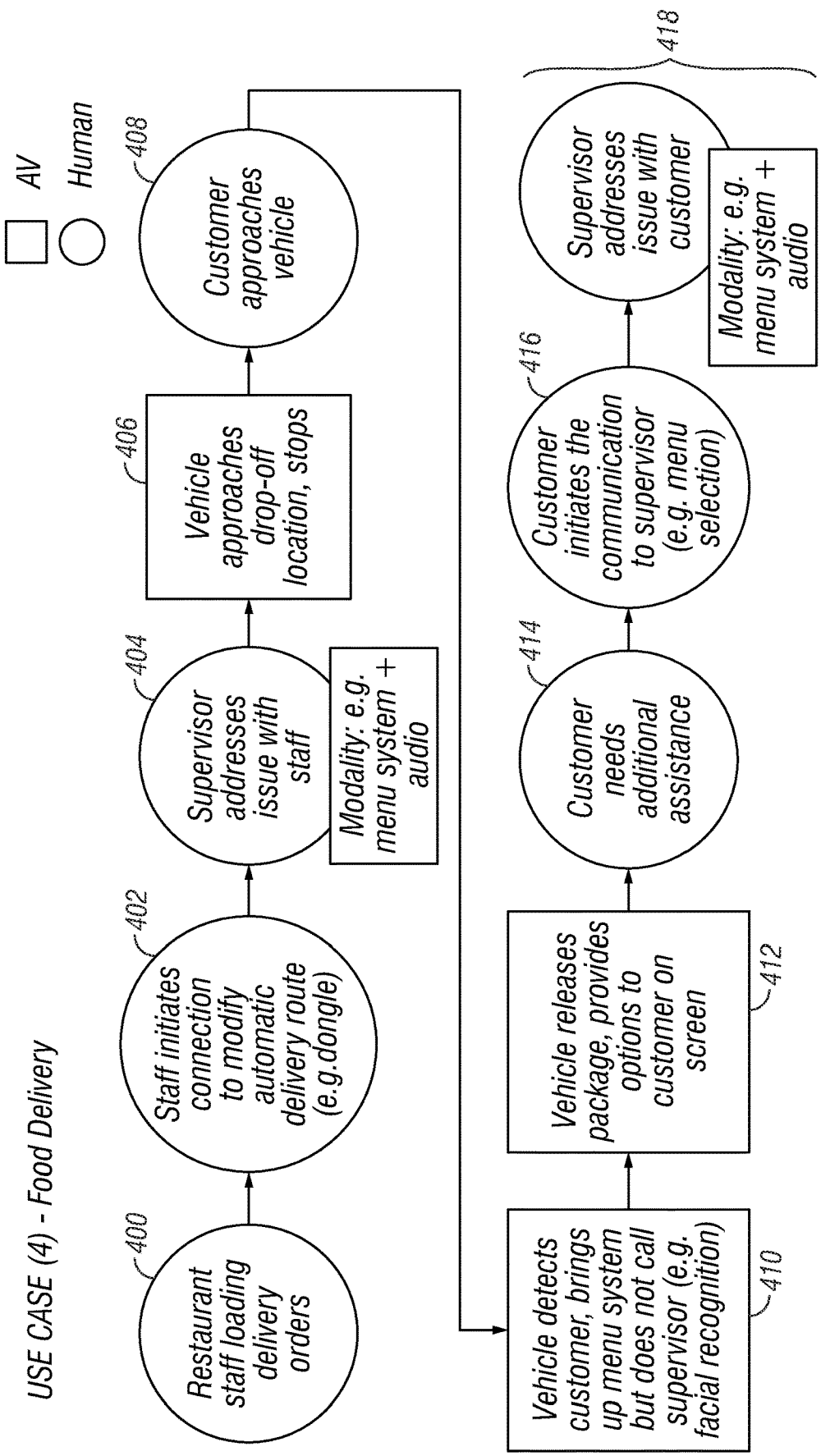
FIG. 10 is a flow diagram illustrating an example of operations performed by the autonomous vehicle communication system shown in FIG. 1 to initiate communication between a vehicle manager and an external agent in a situation in which a food order is being delivered to an autonomous vehicle.

FIG. 10 is a flow diagram illustrating an example of operations performed by the autonomous vehicle communication system 10 to initiate communication between a vehicle manager 14 and an external agent 18 in a situation in which a food order is being delivered to an autonomous vehicle 12. In Step 400, a restaurant staff is loading delivery orders in an autonomous vehicle 12. In Step 402, the restaurant staff initiates communication with a vehicle manager 14 to, for example, modify the delivery route. The restaurant staff can use, for example, a dongle or any other type of technology to initiate communication at the autonomous vehicle 12 in any of the manners described above. Naturally, the restaurant staff can use a communication device 18A such as that described above with regard to FIG. 4, to initiate communication with the vehicle manager 14.

Upon detecting the request from the restaurant staff, the controller 20 of the autonomous vehicle 12 can send a request to the vehicle manager 14 to initiate communication between the vehicle manager 14 and the restaurant staff, who is now acting as an external agent 18, in Step 404. The vehicle manager 14 can communicate with the restaurant staff (external agent 18) in Step 404 using, for example, audio communication and a menu system, or any of the other types of communication described above.

In Step 406, the vehicle manger 14 teleoperatively can control the autonomous vehicle 12 to use the modified delivery route to travel to the drop-off location. In Step 408, a customer approaches the autonomous vehicle 12 at the drop-off location. In Step 410, the autonomous vehicle 12 can detect the approaching customer using, for example, facial recognition technology or any of the technologies described above. However, in this circumstance, the controller 20 does not send a request to the vehicle supervisor 14 to initiate communication. Instead, in Step 412, the controller 20 of the autonomous vehicle 12 opens, for example, a storage compartment in which the food delivery is stored, to allow the customer to access the food delivery.

In Step 414, the customer determines that additional assistance is needed. Therefore, in Step 416, the customer initiates communication with the vehicle manager 14 using, for example, a menu selection on a display of the vehicle equipment 42 at the autonomous vehicle 12, or any of the other technologies described above. The customer can also use a communication device 18A such as that described above with regard to FIG. 4, to initiate communication with the vehicle manager 14. In Step 418, the vehicle manager 14 and the customer, acting as an external agent, communicate using, for example, a menu system and audio communication, or any of the communication modalities described above, to resolve the issue.

As can be appreciated from the above, the autonomous vehicle communication system 10 can initiate communication between a vehicle manager 14 and an external agent 18 to resolve issues that may arise in many different situations. For instance, the communication can be used for an autonomous vehicle 12 in a construction zone where the autonomous vehicle 12 needs to move or detour based on the construction worker's instructions. The communication can be used for a package delivery process in which a package recipient walks to the autonomous vehicle 12 to collect the packages and needs human assistance. In an automated taxi, for example, in which a passenger suffers a medical emergency, the communication can be used to operate the autonomous vehicle 12 to pull to a safe spot on the shoulder to ease access for emergency services, and to contact emergency personnel. Furthermore, the communication can be used to communicate with an automated bus, which may need to hold for longer at a particular stop to wait for a passenger transferring from another bus that is running late. In addition, the communication can be used for an autonomous vehicle 12 that is having difficulties operating appropriately, for which a human is required to diagnose the problem and determine whether the autonomous vehicle 12 should remain in service or be towed for maintenance. In each of these cases, a remotely located vehicle manager 14 could monitor sensed conditions pertaining to the autonomous vehicle 12, and exercise some control authority over the autonomous vehicle 12 as discussed herein.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," or "element" when used in the singular can have the dual meaning of a single part or a plurality of parts. Accordingly, these terms, as utilized to describe the present invention should be interpreted relative to an autonomous vehicle communication system.

The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An autonomous vehicle communication method comprising:
    sensing a condition associated with the autonomous vehicle;
    transmitting the sensed condition to a vehicle manager;
    detecting an external agent external of a vehicle with an externally mounted sensor of the autonomous vehicle;
    initiating, by a controller disposed in the autonomous vehicle in response to the sensing of the condition, communication pertaining to the autonomous vehicle between the vehicle manager remote to the autonomous vehicle and the external agent external to the autonomous vehicle, the external agent being detected prior to initiating communication with the external agent; and
    controlling the autonomous vehicle remotely in response to a command that is based on the condition associated with the autonomous vehicle and the communication between the vehicle manager and the external agent.

2. The method according to claim 1, wherein
    the initiating of the communication includes controlling the controller to initiate the communication by operating an interface at the autonomous vehicle to receive input to control the controller to initiate the communication.

3. The method according to claim 1, wherein
    the initiating is performed by the controller that is onboard the autonomous vehicle.

4. The method according to claim 1, wherein
    the initiating is performed by the controller that is operated by the external agent.

5. The method according to claim 1, wherein
    the sensing includes operating at least one sensor onboard the autonomous vehicle to sense the condition.

6. The method according to claim 1, wherein
    the condition pertains to a driving pattern of the autonomous vehicle when in a state operated by a driver, the condition being indicative of a condition of a person in the passenger compartment of the autonomous vehicle.

7. The method according to claim 1, wherein the condition pertains to an environment external to the autonomous vehicle.

8. The method according to claim 1, wherein the condition pertains to an item being provided to the autonomous vehicle from a location external to the vehicle.

9. The method according to claim 1, wherein the initiating of the communication includes initiating at least one of an audio communication, a visual communication and a data communication between the vehicle manager and the external agent.

10. The method according to claim 1, wherein the initiating is performed by the controller that is operated by the vehicle manager.

11. An autonomous vehicle communication system comprising:
- a sensor configured to sense a condition associated with the autonomous vehicle;
- a transceiver configured to transmit the sensed condition to a vehicle manager;
- a controller disposed in the autonomous vehicle configured to, in response to sensing of the condition, initiate communication pertaining to the autonomous vehicle between the vehicle manager remote to the autonomous vehicle and an external agent external to the autonomous vehicle, the external agent being detected externally of a vehicle by an externally mounted sensor of the autonomous vehicle prior to the communication being initiated; and
- an autonomous vehicle controller configured to remotely control the autonomous vehicle in response to a command that is based on the condition associated with the autonomous vehicle and the communication between the vehicle manager and the external agent.

12. The system according to claim 11, further comprising an interface disposed at the autonomous vehicle and configured to receive input to control the controller to initiate the communication.

13. The system according to claim 11, wherein the external agent includes the autonomous vehicle controller.

14. The system according to claim 11, wherein the controller is configured for operation by the external agent.

15. The system according to claim 11, wherein the sensor is disposed on-board the autonomous vehicle to sense the condition.

16. The system according to claim 11, wherein the condition pertains to a driving pattern of the autonomous vehicle when in a state operated by a driver, the condition being indicative of a condition of a person in the passenger compartment of the autonomous vehicle.

17. The system according to claim 11, wherein the condition pertains to an environment external to the autonomous vehicle.

18. The system according to claim 11, wherein the condition pertains to an item being provided to the autonomous vehicle from a location external to the vehicle.

19. The system according to claim 11, wherein the controller is further configured to initiate the communication as at least one of an audio communication, a visual communication and a data communication between the vehicle manager and the external agent.

20. The method according to claim 11, wherein the controller is configured to initiate communication pertaining to the autonomous vehicle between the vehicle manager remote to the autonomous vehicle and the external agent external to the vehicle in response to sensing of the condition and an authorized communication initiation request from at least one of the vehicle manager, the external agent, and the autonomous vehicle.

* * * * *